(12) United States Patent
Sauerbrey (10) Patent No.: US 9,222,591 B2
(45) Date of Patent: Dec. 29, 2015

(54) ADJUSTABLE DAMPING VALVE

(71) Applicant: ZF Friedrichshafen AG, Friedrichshafen (DE)

(72) Inventor: Achim Sauerbrey, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 189 days.

(21) Appl. No.: 13/785,046

(22) Filed: Mar. 5, 2013

(65) Prior Publication Data

US 2013/0248750 A1 Sep. 26, 2013

(30) Foreign Application Priority Data

Mar. 7, 2012 (DE) .......................... 10 2012 203 542

(51) Int. Cl.
*F16K 25/00* (2006.01)
*F16F 9/46* (2006.01)

(52) U.S. Cl.
CPC ................. *F16K 25/00* (2013.01); *F16F 9/464* (2013.01); *F16F 2226/04* (2013.01)

(58) Field of Classification Search
CPC ....... F16F 9/464; F16F 9/461; F16F 2226/04; F16K 25/00; H01F 7/128
USPC ...................... 251/129.15; 335/278, 281, 297; 188/322.14
See application file for complete search history.

(56) References Cited

U.S. PATENT DOCUMENTS

| | | | | |
|---|---|---|---|---|
| 4,679,767 A | * | 7/1987 | Vollmer et al. | .......... 251/129.15 |
| 5,154,264 A | | 10/1992 | Poertzgen | |
| 5,277,281 A | * | 1/1994 | Carlson et al. | ................ 188/267 |
| 5,988,605 A | | 11/1999 | Weisser | |
| 6,343,677 B2 | * | 2/2002 | Bell | .............................. 188/315 |
| 6,588,093 B1 | | 7/2003 | Emmerich | |
| 6,784,773 B2 | * | 8/2004 | Tsutsui et al. | ................... 335/78 |
| 6,922,124 B2 | * | 7/2005 | Segi et al. | ..................... 335/220 |
| 7,845,617 B2 | * | 12/2010 | Cobianchi et al. | ....... 251/129.15 |
| 2011/0285484 A1 | | 11/2011 | Hoppe | |
| 2013/0249657 A1 | * | 9/2013 | Horii et al. | ..................... 335/202 |

FOREIGN PATENT DOCUMENTS

| | | |
|---|---|---|
| DE | 1977485 | 1/1968 |
| DE | 1750922 | 1/1971 |
| DE | 3640447 | 7/1988 |
| DE | 3800288 | 6/1989 |
| DE | 3904585 | 8/1990 |
| DE | 4229308 | 3/1994 |
| DE | 19714646 | 10/1998 |
| DE | 19822448 | 1/1999 |
| DE | 19741364 | 4/1999 |
| DE | 102009006355 | 7/2010 |
| DE | 102009059808 | 6/2011 |

* cited by examiner

*Primary Examiner* — Matthew W Jellett
(74) *Attorney, Agent, or Firm* — Cozen O'Connor (57) ABSTRACT

An adjustable damping valve has a valve housing in which is arranged a coil housing and an annular back-iron member which are connected in a magnetically conducting manner to a valve armature. The back-iron member radially penetrates the coil housing via a plurality of windows and has flattened portions at the edge. The at least one window in the coil housing has a width corresponding at least to the width of the back-iron member in at least one assembly position so that the back-iron member can be inserted radially into the coil housing via the at least one window.

11 Claims, 7 Drawing Sheets

ADJUSTABLE DAMPING VALVE

BACKGROUND OF THE INVENTION

1. Field of the Invention

The invention is directed to an adjustable damping valve having an actuator including a back-iron member and a housing with at least one window.

2. Description of the Related Art

DE 10 2009 059 808 A1 describes an adjustable damping valve whose actuator is optimized as regards producibilty. A core idea consists in the use of a solid, disk-shaped interference body or back-iron member which is overmolded in the production process. However, the solid constructional form limits the choice of material for the back-iron member. Further, burrs must be removed in a time-consuming fashion.

According to DE 10 2009 059 808 A1, a coil housing is produced by injection molding and comprises a coil receptacle with a base. The coil housing has radial windows by which the back-iron member communicates conductively with the inner wall of a valve housing. The back-iron member is enclosed by the wall of the coil housing so as to be axially and radially fixed.

The coil is sealed by means of two O-rings at the front ends and a surrounding O-ring at a cylindrical outer surface of the coil housing. The O-rings at the front ends in particular could slip out of their predetermined installation position during assembly and thwart an optimal sealing function thereof.

SUMMARY OF THE INVENTION

It is an object of the present invention to further optimize the adjustable damping valve with regard to the producibilty thereof.

According to the invention, this object is met in that the at least one window in the coil housing has a width corresponding at least to the width of the back-iron member in at least one assembly position so that the back-iron member can be inserted radially into the coil housing via the at least one window.

The great advantage of the invention consists in that the back-iron member can be assembled after the completion of the coil housing. Therefore, the back-iron member is also not exposed to any mechanical or thermal stresses during the process of assembly. Further, the back-iron member need not be positioned in relation to the coil during the overmolding process for the coil. The production of the coil and the positioning of the back-iron member are separate assembly steps.

In a further advantageous embodiment, the coil housing has a guide path for receiving the back-iron member. The back-iron member is inserted at the window that is provided in the coil housing for assembly and slides along the guide path into the final assembly position. Accordingly, the assembling movement can easily be automated.

According to a further advantageous embodiment, the window for assembling the back-iron member is wider than an at least second window. Consequently, the back-iron member cannot unintentionally be pushed past the predetermined position during assembly.

In addition, it can be provided that the back-iron member has at least one assembly stop. The stop for the back-iron member, regardless of its specific embodiment, advantageously presents a contact surface which reduces the magnetic resistance within the magnetic flux.

The back-iron member closes the window in the coil body in the final assembly position in order to achieve the best possible magnetic flux within the valve housing on the one hand and to prevent penetration of foreign matter on the other hand.

The back-iron member has two mirror-image stops at its circumferential contour so that the back-iron member can be mounted either way in the coil housing.

In yet a further embodiment, it is provided that the constructional unit of the coil housing has sealing elements which are molded thereon and which contact the valve housing. In contrast to the prior art cited above, three O-rings are eliminated without impairing sealing quality.

It is further provided that the seal elements position the constructional unit within the valve housing. The positioning function extends in the longitudinal direction but also in the center axis of the valve housing. Apart from the sealing function and positioning function, the sealing elements also have a heat compensation function.

The idea of the molded-on sealing elements also permits the windows to have a surrounding sealing strip. Accordingly, a seal can be provided where it has an especially important function and not merely where there is available installation space for a typical O-ring.

Another embodiment which can be combined with the two embodiments mentioned above consists in that the back-iron member is formed by laminated sheet metal members.

In this way, materials which were not available previously for the one-piece design or which were very difficult to machine can be used for the back-iron member.

To achieve a manageable constructional unit in spite of the laminated construction of the back-iron member, the laminated sheet metal members are connected to one another by stamp stacking.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be more fully described in conjunction with the accompanying drawings in which.

DETAILED DESCRIPTION OF THE PRESENTLY PREFERRED EMBODIMENTS

Figure 1:
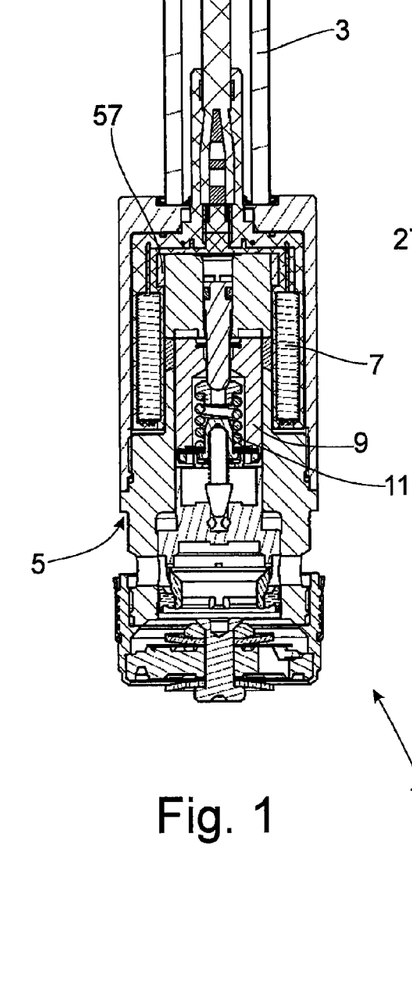
FIG. 1 is a view of an adjustable damping valve in longitudinal section.
Figure 2:
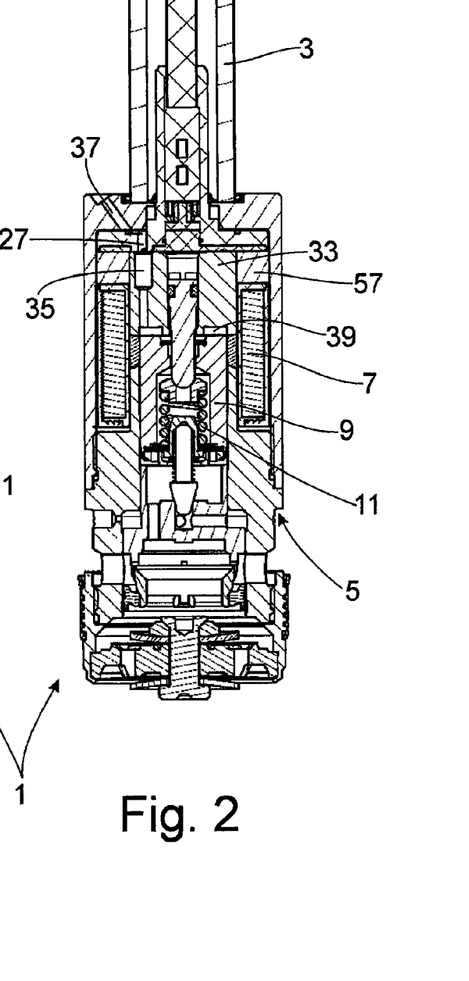
FIG. 2 is a view of an adjustable damping valve in longitudinal section.

FIGS. 1 and 2 show an adjustable damping valve 1 at a hollow piston rod 3. The adjustable damping valve 1 has an actuator in a valve housing 5, which actuator includes a coil 7 exerting an actuating force on an axially movable valve armature 9 against the force of a valve spring 11. The mode of operation of the adjustable damping valve is already well known from DE 198 22 448 C2, the content of which is incorporated herein by reference in its entirety.

Figure 3:
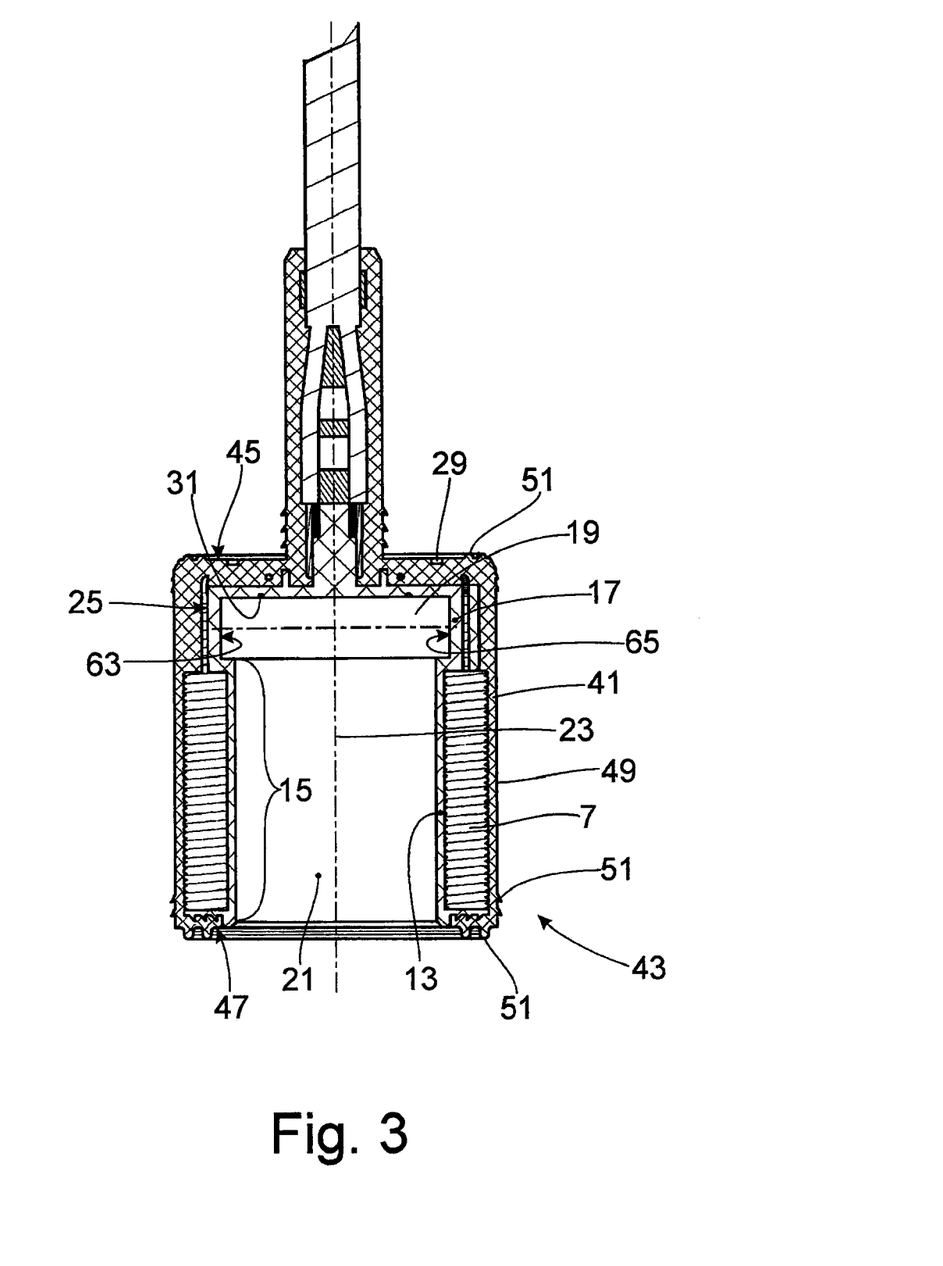
FIG. 3 is a view of an adjustable damping valve in longitudinal section also showing the coil wound on a coil carrier.

The coil 7 is wound on a coil carrier 13 shown in FIG. 3. The coil carrier 13 has a sleeve portion 15 having a slot or groove for the winding of the coil. A base 17 having a transverse opening 19 which completely penetrates the base 17 adjoins the sleeve portion 15 at one end. The transverse opening 19 and an axial opening 21 are connected to one another and intersect the principal axis 23 of the coil carrier 13.

When FIGS. 1 to 3B are viewed in conjunction, it will be seen that the coil carrier 13 has radial grooves 25 for receiving the coil wire. These grooves 25 are radially separated from the transverse opening 19 of the coil carrier 13.

The base 17 of the coil carrier 13 further comprises an axial opening 27 which passes into a circumferential groove 29; 31 on both top sides of the base 17 to allow convenient assembly of a coil core 33 having a connection opening 35. The connection opening 35, axial opening 27 and a connection channel 37 in the valve housing 5 connect a back valve space 39 to a work space, not shown, on the piston rod side.

Figures 3A, 3B, 3C, 3D, 3E, 3F:
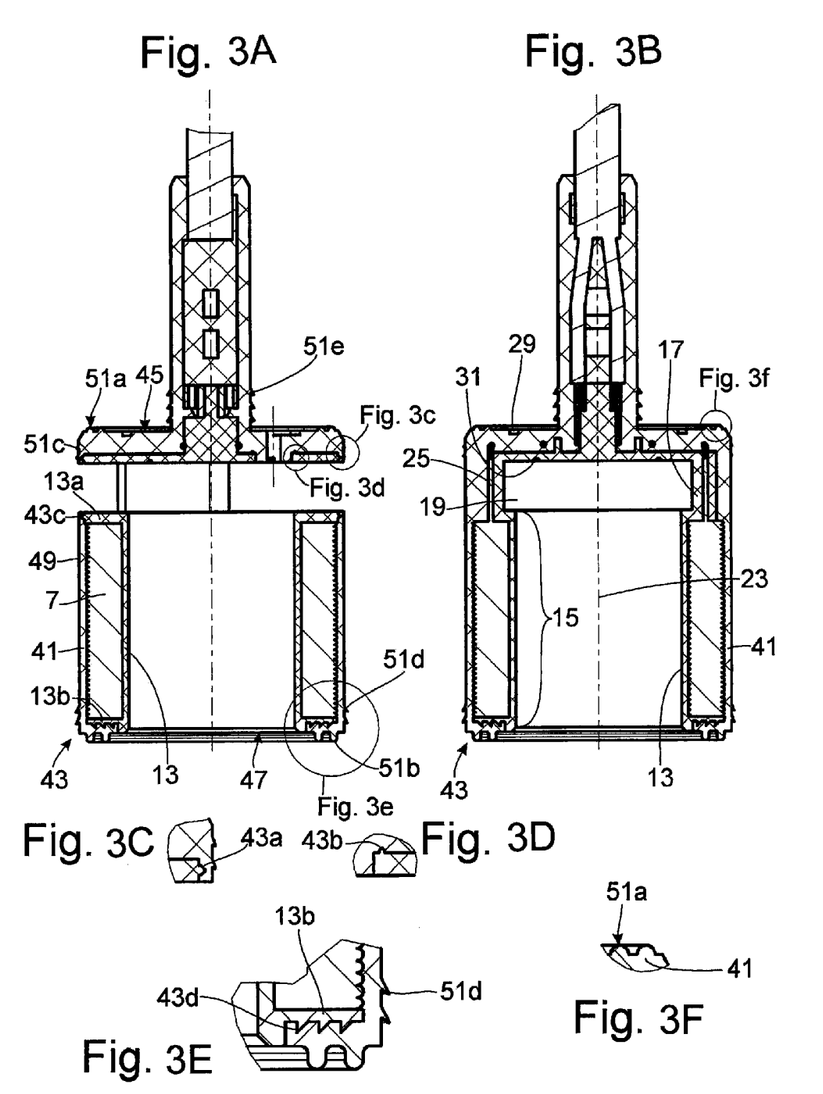
FIG. 3A is a further view of an adjustable damping valve in longitudinal section.
FIG. 3B is a further view of an adjustable damping valve in longitudinal section.
FIG. 3C is a view of a detail of FIG. 3A.
FIG. 3D is a view of another detail of FIG. 3A.
FIG. 3E is a view of yet another detail of FIG. 3A.
FIG. 3F is a view of a detail of FIG. 3B.

It will be seen from FIGS. 3A; 3B that the coil carrier 13 and the coil 7 are enclosed on the outer side by a cover layer 41 and accordingly form a coil housing 43. With respect to the cover layer, the choice of material is basically between an elastomer and a thermoplastic. For sealing the coil, the coil carrier 13 has seal contours 43a-43d, FIGS. 3C-3E, which take over the sealing function along with the cover layer 41. The seal contours 43a-43d are arranged in the vicinity of edges of the coil carrier 13. Thus a groove side wall 13a of the coil carrier has a seal contour 43c on the radially outer side. At least one seal contour 43a; 43b is also formed in the region of the through-opening 19. Also, a second groove side wall 13b has at least one seal contour 43d on the outer side. The cover layer 41 is applied by overmolding and completely seals the coil 7. In so doing, the seal contours 43a-43d increase the surface size so that the bond between the cover layer 41 and coil carrier 13 is improved. In the assembly state shown in FIGS. 3A and 3B, no damping medium could penetrate into the coil 7. With a thermoplastic cover layer, the seal contours 43a-43d are fused on and the connection is accordingly additionally enlarged. The elastomer cover layer 43 is vulcanized on the seal contours 43a-43d and forms a positive engagement with the seal contours. This affords the advantage that a compressive load on the cover layer 43 is also transmitted to the seal contours 43a-43d which are accordingly pre-loaded to a greater extent and accordingly have an improved sealing function.

Seal elements 51a; 51b; 51c, 51d are molded to the front sides 45; 47 and to the ends of an outer lateral surface 49. The seal elements 51a; 51b; 51c; 51d are made from the same base material as the cover layer 41. Additional seals, e.g., O-rings, are not needed.

The front seal elements 51a, 51b, FIGS. 3E-3F, fix the coil 7 axially inside the valve housing 5 (FIG. 1). The seal elements 51c, 51d at the outer lateral surface 49 serve in turn for radial positioning of the coil housing 43 inside the valve housing 5.

The coil housing 43 has a further seal element 51e which seals the coil housing relative to the hollow piston rod 3.

Figure 4:
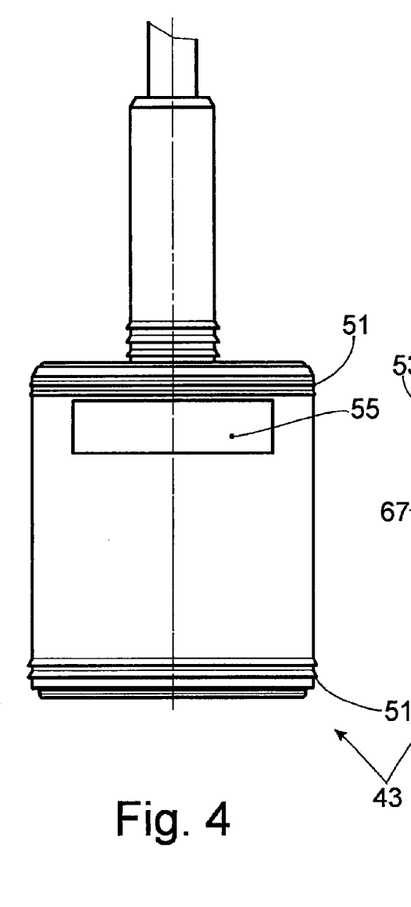
FIG. 4 is a view of a coil carrier in front elevation.
Figure 5:
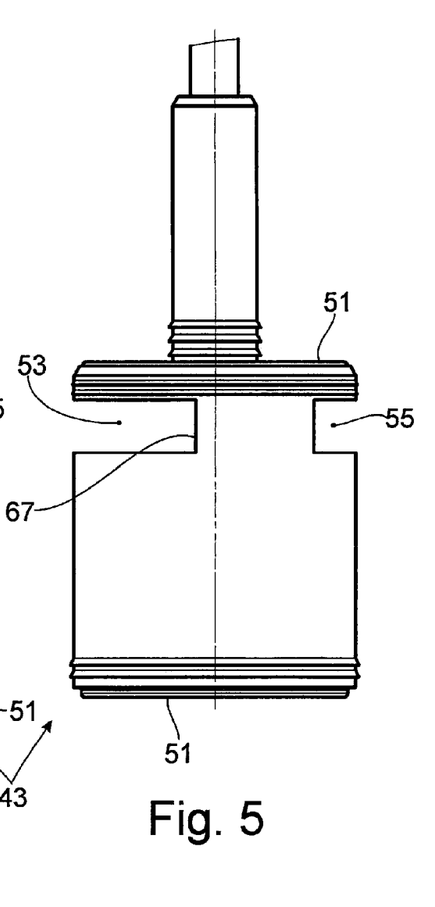
FIG. 5 is a view of a coil carrier in front elevation.

FIGS. 4 and 5 show two front elevations of the coil housing 43 with the seal elements 51 as a constructional unit. The coil housing 43 has a different width at the ends of the transverse opening 19 by two opposed windows 53; 55. The two opposed windows could also have the same width in principle. A back-iron member 57 shown in FIGS. 6 to 9 can be inserted into the larger of the two windows 53. When the two opposed windows 53; 55 have the same width in circumferential direction of the coil housing 43, the back-iron member 57 has parallel chord-shaped flattened portions. In the present illustration, the back-iron member 57 has two assembly stops 59 which are formed in a mirror-inverted manner at its circumferential contour. A recess is provided at the edge on both sides to form the assembly stops 59 resulting in two parallel flattened portions 61 with stops 59 at the ends thereof. The flattened portions 61 slide on parallel guide paths 63; 65 (FIG. 3) in the transverse opening 19 of the coil housing 43 and accordingly form a receptacle for the back-iron member 57. An unambiguous assembly direction and assembly movement are achieved by means of the guide paths 63; 65 in conjunction with the flattened portions 61. The assembly stops 59 which contact axial window edges 67 define the final assembly position of the back-iron member 57 in the coil housing 43. When the coil core 33 is mounted in a receiving opening 69, a further displacing movement of the back-iron member 57 is blocked independently from the action of the assembly stops 59.

Figure 6:
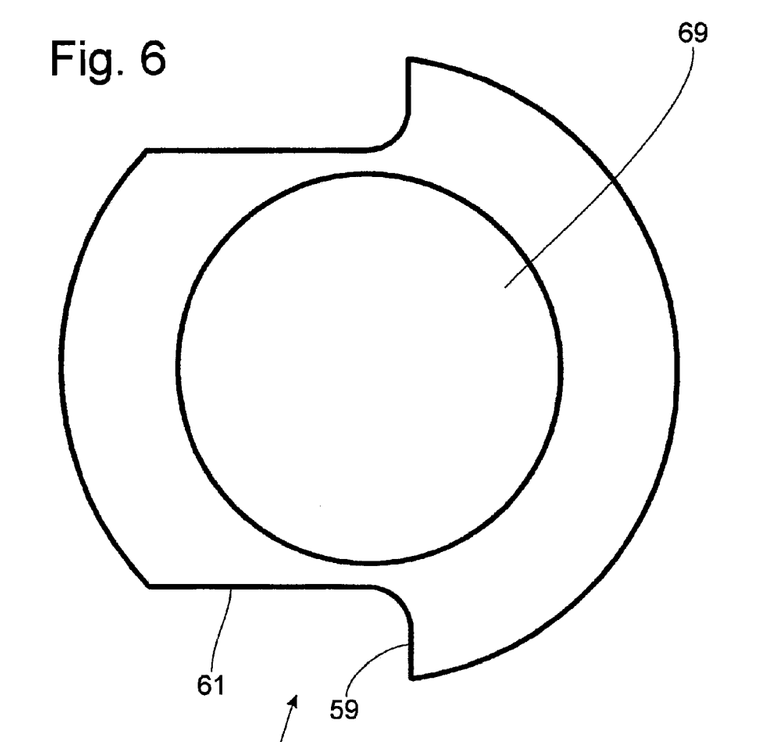
FIG. 6 is a plan view of a back-iron member.
Figure 7:
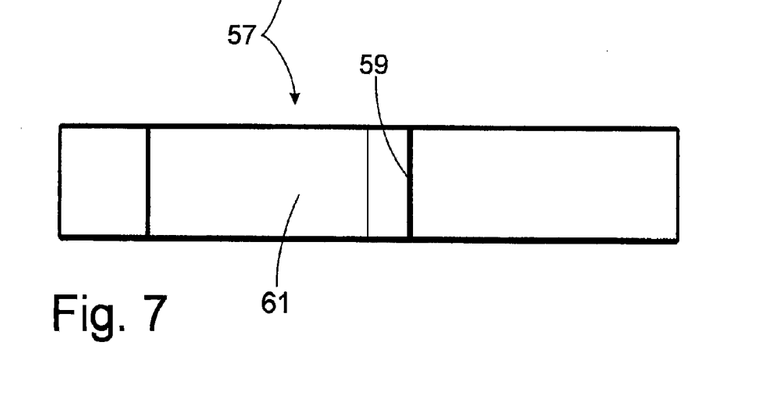
FIG. 7 is a side view of a back-iron member.
Figure 8:
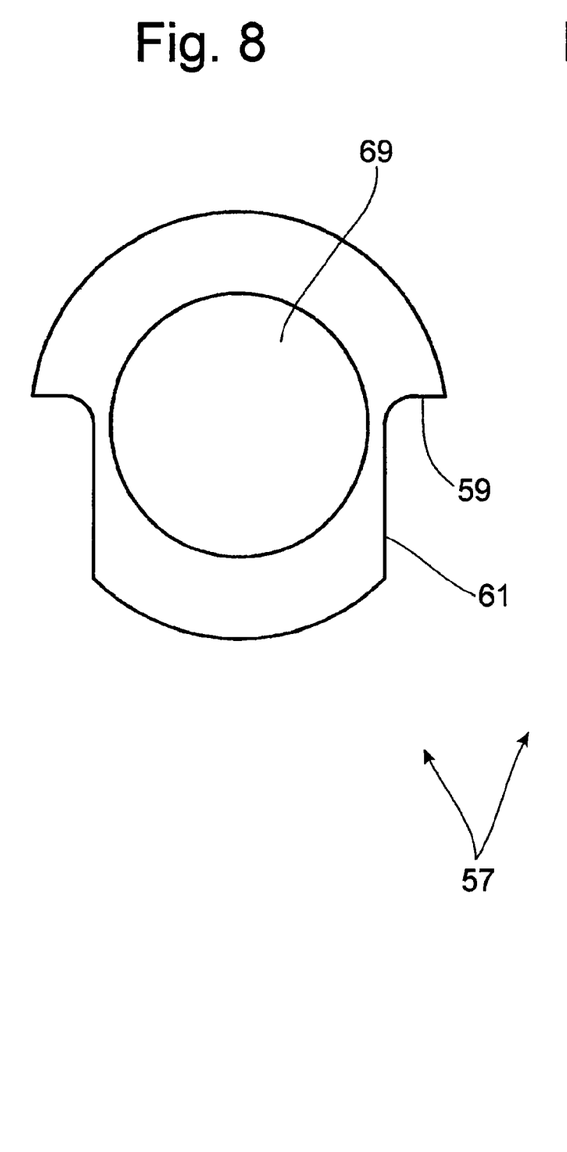
FIG. 8 is a plan view of a back-iron member.
Figure 9:
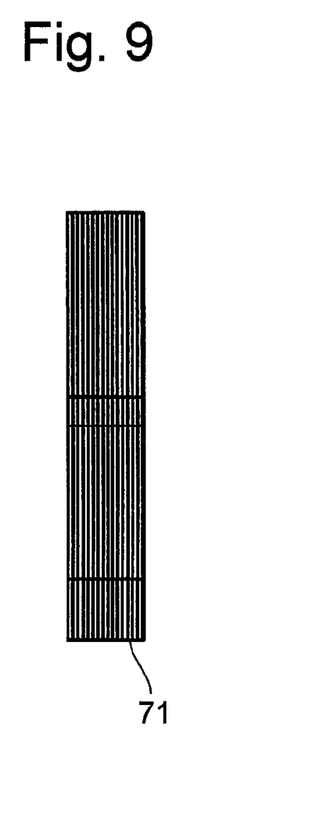
FIG. 9 is a side view of a back-iron member.

In FIGS. 6 and 7, the back-iron member 57 is formed as a solid structural component part. However, an embodiment according to FIGS. 8 and 9 in which the back-iron member 57 is formed by laminated sheet metal members 71 is preferred. These sheet metal elements 71 can be assembled as a stack of laminations to form a constructional unit.

Figures 10, 11:
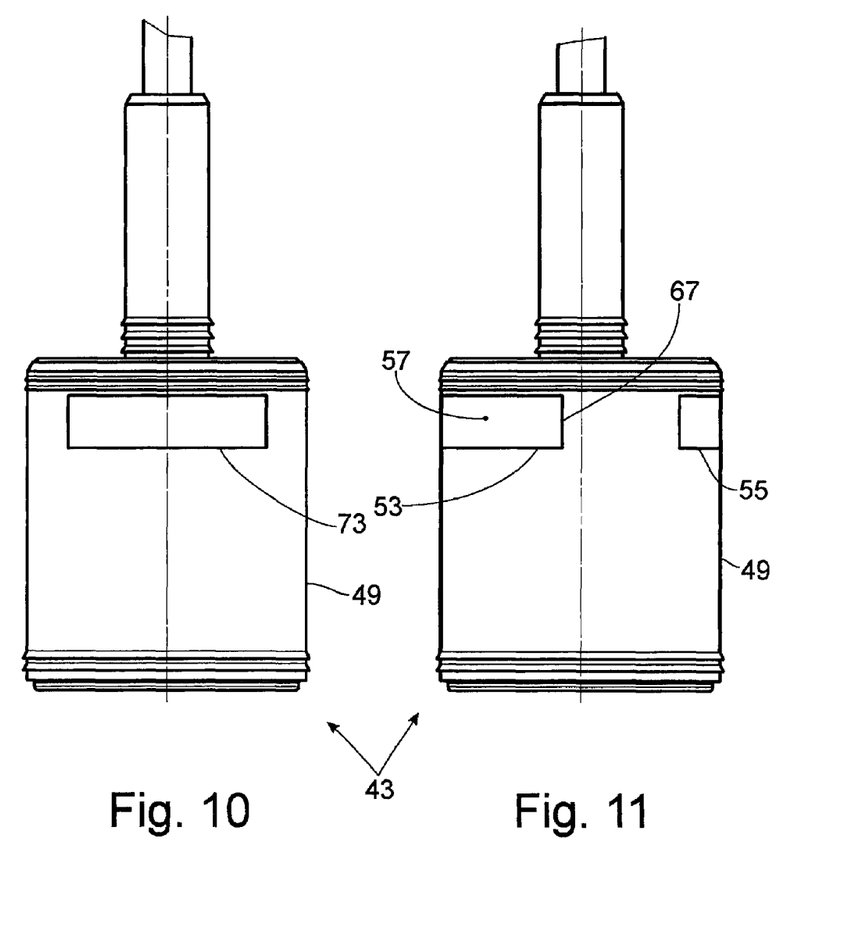
FIG. 10 is a side view of the coil housing with back-iron member.
FIG. 11 is another side view of the coil housing with back-iron member.

FIGS. 10 and 11 show the back-iron member 57 which can be inserted radially into the coil housing 43 via at least one window 53. It will be seen that the back-iron member 57 closes the window 53; 55 in the coil housing in the final assembly position and, therefore, also completely penetrates the coil housing up to the lateral surface 49. The windows 53; 55 can have surrounding sealing strips 73.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An adjustable damping valve (1) comprising:
a valve housing (5);
a coil housing (43) having at least one window;
an annular back-iron member (57) having a width; said coil housing and said back-iron member disposed in said valve housing (5) about a centrally aligned axis; said back-iron member (57) radially penetrating said coil housing (43) via said at least one window (53; 55) and comprising flattened edge portions (61); said at least one window (53) in said coil housing (43) having a width corresponding at least to said width of the back-iron member (57) in at least one assembly position so that said back-iron member (57) is insertable transverse to said centrally aligned axis into said coil housing (43) throuoh said at least one window (53).

2. The adjustable damping valve according to claim 1, wherein said coil housing (43) comprises a guide path (63; 65) for receiving the back-iron member (57).

3. The adjustable damping valve according to claim 1, wherein said at least one window (53) for inserting said back-iron member (57) is wider than an at least second window (55).

4. The adjustable damping valve according to claim 1, wherein said back-iron member (57) comprises at least one assembly stop (59).

5. The adjustable damping valve according to claim 1, wherein said back-iron member (57) closes said window (53; 55) in said coil housing (43) in a final assembly position.

6. The adjustable damping valve according to claim 4, wherein said back-iron member (59) has two mirror-image stops (59) at its circumferential contour.

7. The adjustable damping valve according to claim 1, additionally comprising a coil (7) and a coil carrier (13); and wherein said coil (7), said back-iron member (57) and said coil carrier (13) form a closed constructional unit which is sealed inside said valve housing (5), and comprises molded-on seal elements (51; 73) contacting said valve housing (5).

8. The adjustable damping valve according to claim 7, wherein said seal elements (51a-51d) are constructed to position said constructional unit within said valve housing (5).

9. The adjustable damping valve according to claim 7, wherein said at least one window (53; 55) comprises a surrounding sealing strip (73).

10. The adjustable damping valve according to claim 1, wherein said back-iron member (57) is formed by laminated sheet metal members (71).

11. The adjustable damping valve according to claim 10, wherein said laminated sheet metal members (71) are connected to one another by stamp stacking.

* * * * *